United States Patent
Li et al.

(10) Patent No.: US 9,524,279 B2
(45) Date of Patent: Dec. 20, 2016

(54) HELP DOCUMENT ANIMATED VISUALIZATION

(75) Inventors: Fan Li, Beijing (CN); Qingwei Lin, Beijing (CN); Jiang Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 576 days.

(21) Appl. No.: 12/914,327

(22) Filed: Oct. 28, 2010

(65) Prior Publication Data

US 2012/0110444 A1     May 3, 2012

(51) Int. Cl.
G06F 17/24     (2006.01)
G06F 17/22     (2006.01)
G06F 17/27     (2006.01)

(52) U.S. Cl.
CPC ......... G06F 17/241 (2013.01); G06F 17/2276 (2013.01); G06F 17/271 (2013.01)

(58) Field of Classification Search
CPC ...... G06F 21/6218; G06F 21/629; G06F 8/60; G06F 17/5009; G06F 8/38; G06F 17/271; G06F 17/241; G06F 17/2276; G05B 19/0426; G05B 2219/36071
USPC ........................................ 715/235, 256, 709
See application file for complete search history.

(56) References Cited

U.S. PATENT DOCUMENTS

| | | | | |
|---|---|---|---|---|
| 5,377,319 A | * | 12/1994 | Kitahara et al. | 715/707 |
| 5,546,521 A | * | 8/1996 | Martinez | 715/711 |
| 5,619,700 A | * | 4/1997 | Abe | 717/122 |
| 5,893,916 A | * | 4/1999 | Dooley | 715/234 |
| 5,923,325 A | * | 7/1999 | Barber | G06F 3/04895 715/711 |
| 5,933,139 A | * | 8/1999 | Feigner | G06F 9/4446 715/708 |
| 6,020,886 A | * | 2/2000 | Jacober et al. | 715/709 |
| 6,292,203 B1 | * | 9/2001 | Wang | G06F 3/04812 345/682 |
| 7,024,658 B1 | * | 4/2006 | Cohen et al. | 717/117 |
| 7,346,846 B2 | | 3/2008 | Rossi, Jr. et al. | |
| 7,587,668 B2 | | 9/2009 | Bala | |
| 7,644,367 B2 | | 1/2010 | McKeon et al. | |
| 7,886,227 B2 | * | 2/2011 | Aggarwal | G06F 9/4446 715/705 |
| 8,060,357 B2 | * | 11/2011 | Segond | G06F 17/2247 704/1 |
| 2004/0130572 A1 | * | 7/2004 | Bala | 345/762 |

(Continued)

OTHER PUBLICATIONS

Byrd, "A Scrollbar-based Visualization for Document Navigation", ACM, Proceedings of Conference on Digital Libraries, Berkeley, California, Aug. 1999, pp. 122-129.

(Continued)

*Primary Examiner* — Laurie Ries
*Assistant Examiner* — Brian Garmon
(74) *Attorney, Agent, or Firm* — Tom Wong; Micky Minhas; Lee & Hayes PLLC

(57) ABSTRACT

Data for performing help document animated visualization is obtained by generating operation records from a text-based help document of an application. Each of the operation records may include data for animating an operation action that is performed on a user interface (UI) element of the application. The help document is further enhanced to include controls that load the operation records. The enhanced help documents and the operation records are distributed for use.

19 Claims, 5 Drawing Sheets

(56) References Cited

U.S. PATENT DOCUMENTS

| | | | |
|---|---|---|---|
| 2005/0015639 A1* | 1/2005 | Cornelius | G06F 3/0481 |
| | | | 714/1 |
| 2007/0044034 A1* | 2/2007 | Nieves | G06Q 20/203 |
| | | | 715/771 |
| 2008/0034288 A1* | 2/2008 | Landar et al. | 715/700 |
| 2008/0172612 A1* | 7/2008 | Allen et al. | 715/708 |
| 2008/0295076 A1 | 11/2008 | McKain et al. | |
| 2010/0201692 A1* | 8/2010 | Niles et al. | 345/473 |

OTHER PUBLICATIONS

Hoi, et al., "Document Visualization on Small Displays", Proceedings of International Conference on Mobile Data Management, Jan. 2003, pp. 262-278.

Zaman, et al., "What's New in Windows 7 Automation API", EPS Software Corporation, CODE Magazine, vol. 5, No. 4, Oct. 2008, pp. 22-27.

MSDN, "UI Automation and Microsoft Active Accessibility", retrieved on Aug. 3, 2010 at <<http://msdn.microsoft.com/en-us/library/ms788733.aspx>>, Microsoft Developer Network (MSDN), Microsoft Corporation, Jul. 12, 2010, 6 pages.

\* cited by examiner

HELP DOCUMENT ANIMATED VISUALIZATION

BACKGROUND

An application, such as a word processing program, may provide a help document to assist users to understand how to use the features of the application. The help document may include step-by-step text instructions on accessing features of the application via a user interface of the application. However, users may occasionally find such help documents difficult and time consuming to follow, as the locations of the features in the user interface of the application may not be readily apparent from reading the text instructions in the help document. For example, a particular user interface control may reside in a "drop down" menu of the user interface. Accordingly, the particular user interface control may not be visible to the user until the user activates the "drop down" menu. The inconvenience associated with following text instructions in a help document of the application may reduce the effectiveness of the help document.

SUMMARY

Described herein is a help document animated visualization technique that provides graphical visualizations of text-based application help documents. The step-by-step text instructions may be converted by the use of the help document animated visualization technique into corresponding animated representations that assist a user in understanding the steps for the completion of the task. Thus, user confusion caused by text instructions in a help document may be reduced or eliminated, while enhancing an effectiveness of the help document.

In some embodiments, data for performing help document animated visualization is derived by generating operation records from a text-based help document of an application. Each of the operation records may include data for animating an operation action that is performed on a user interface (UI) element of the application. The help document is modified to include controls that load the operation records. The enhanced help documents and the operation records are subsequently distributed for use.

In additional embodiments, help document animated visualization for an application is performed by receiving an enhanced help document and one or more operation records. Each operation record includes data that denotes a hierarchic path from a main window of the application to a user interface (UI) element of the application, as well as data that denotes an operation action to be performed on the UI element. Upon activation of a control in the enhanced help document, the operation actions to be performed on the UI elements are ascertained from the operation records. Further, the UI elements of the application are located based on the hierarchic paths denoted in the operation records. The operation actions specified in the operation records are sequentially performed on the located UI elements.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Help document animated visualization techniques may assist a user in understanding step-by-step text instructions that are in a help document of an application. The help document animated visualization techniques may initially convert the step-by-step text instructions in the help document into operation records. Each operation record may include data regarding a hierarchic path to a particular user interface (UI) element and an operation action to be performed on the particular UI element. When used, a series of operation records that relate to the completion of a particular task via the UI of the application may be played by a user to generate an animated presentation of the steps that are to be performed for the completion of the particular task. In this way, the help document animated visualization techniques may visually present the user with the UI elements that are used to accomplish a task, as well as animate the operation actions that are performed on each UI element.

By implementing the help document animated visualization techniques described herein, user confusion over text instructions or misunderstanding of text instructions in a help document may be reduced or eliminated, and the effectiveness of the help document may be enhanced. Various example implementations of the help document animated visualization techniques are described below with reference to FIGS. 1-6.

Illustrative Environment

Figure 1:
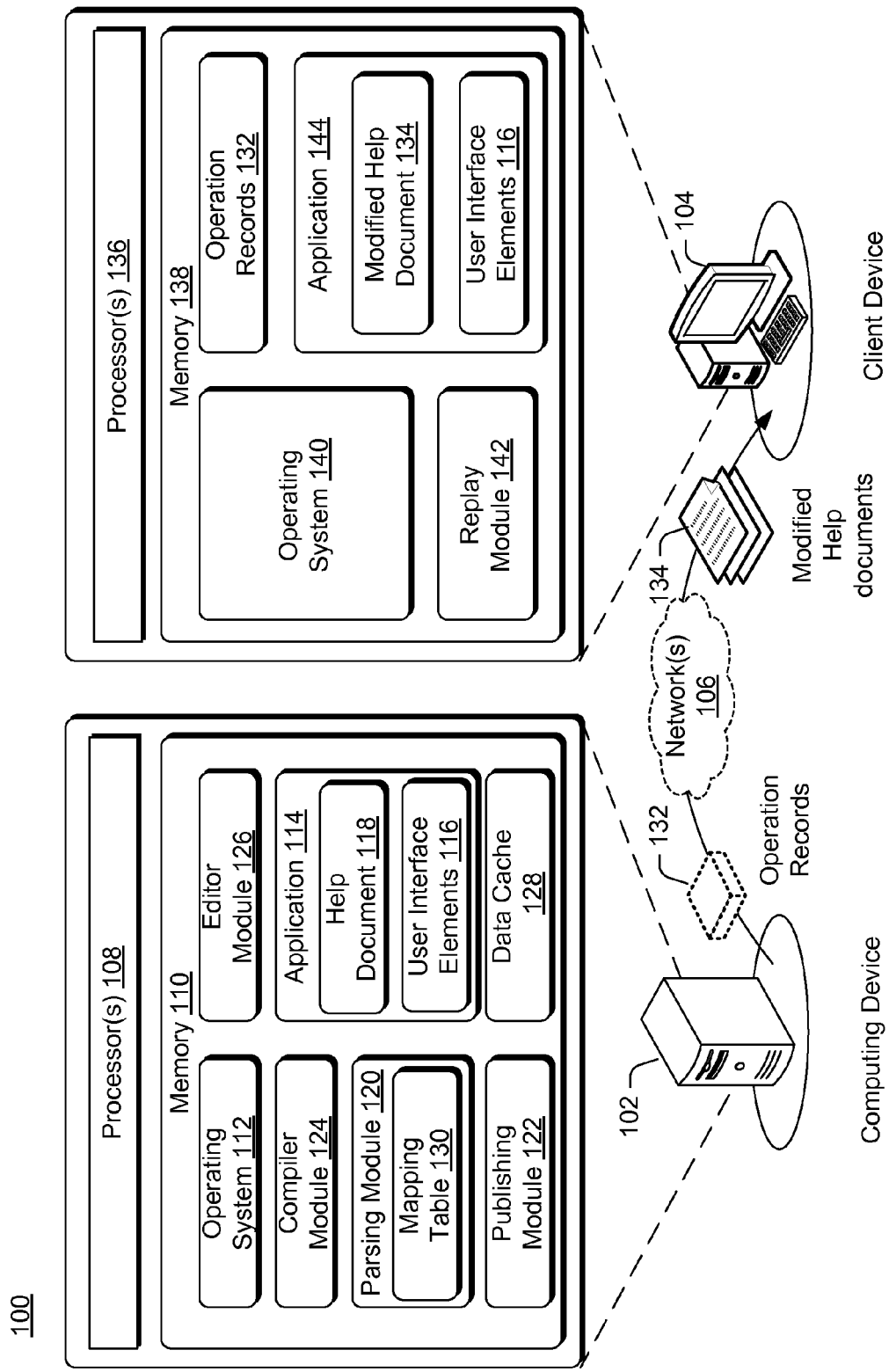
FIG. 1 is a block diagram of an illustrative environment that implements help document animated visualization.

FIG. 1 is a block diagram of an illustrative environment 100 that implements help document animated visualization. The illustrative environment 100 may include a computing device 102 and a client device 104 that are connected by one or more networks 106. The one or more networks 106 may be a local area network ("LAN"), a larger network such as a wide area network ("WAN"), and/or a collection of networks, such as the Internet. Protocols for network communication, such as TCP/IP, may be used to implement the one or more networks 106.

The computing device 102 may be a general purpose computer, such as a server, a desktop computer, and/or the like. The computing device 102 may includes one or more processors 108, memory 110, and/or user controls that enable a user to interact with the device. The user controls of the computing device 102 may include, but are not limited to, combinations of one or more of keypads, keyboards, mouse devices, touch screens, microphones, speech recognition packages, and any other suitable devices or other electronic/software selection methods.

The memory 110 may store an operating system 112. The operating system 112 may include components that enable the computing device 102 to receive data via various inputs (e.g., user controls, network interfaces, and/or memory devices), and process the data using the one or more processors 108 to generate output. The operating system 112 may include one or more components that present the output (e.g., display an image on an electronic display, store data in memory, transmit data to another electronic device, etc.). Additionally, the operating system 112 may include other components that perform various other functions generally associated with an operating system.

The memory 110 may also store an application 114. The application 114 may include a user interface (UI) with various UI elements 116, as well as a help document 118 that provides step-by-step text instructions for completing tasks using the UI of the application 114. For example, the application 114 may be a word processing application, a spreadsheet application, an email application, a web browser application, an operating system, and/or the like. In other embodiments, additional applications or multiple versions of the application 114 may also be stored in the memory 110.

The memory 110 may further store components that generate operation records from the step-by-step text instructions in the help document 118 of the application 114. The components, or modules, may include routines, programs instructions, objects, scripts, and/or data structures that perform particular tasks or implement particular abstract data types. The components may include a parsing module 120, a publishing module 122, a compiler module 124, an editor module 126, and a data cache 128. The components may execute in a desktop environment provided by the operating system 112.

The parsing module 120 may parse the help document 118 into operation records. An operation on a particular UI element of the user interface of the application 114 may be broken down into two components: an operating object and an operation action. The operating object corresponds to a particular UI element, and the operation action corresponds to an action that is performed on the particular UI element. With respect to each task that a user may perform using the application 114, the help document 118 may offer step-by-step text instructions that describe a series of operation actions that are performed to complete the task. For example, the help document 118 may describe operation actions for copying a string of text from one document to another document.

Thus, for each operation action that is described by a corresponding text instruction in the help document 118, the parsing module 120 may parse the text instruction and generate an operation record. The parsing of each text instruction may include two phases: (1) parsing of an operating object, that is, a specific UI element from the text instruction; and (2) parsing of the operation action from the text instruction. A generation of the operation record may include storing data on (1) a hierarchic path from a main window of the application to a particular UI element and (2) the operation action to be performed on the particular UI element.

The parsing module 120 may parse the operation action from a text instruction in the help document 118 by recognizing a verb in the text instruction. A text instruction usually includes a verb and a noun that are expressed using natural language. For example, in the text instruction "click the Help button", "click" is the verb and "Help button" is the noun. The value of the verb may be a part of a limited set that can be mapped to different operation actions. In various embodiments, the parsing module 120 may use a mapping table 130 to accomplish the mapping. For example, the mapping table 130 may include the following example verb and operation action mappings:

| | |
|---|---|
| R-Click | Right mouse button down and up when mouse is at the same location or approximately the same location |
| L-Click | Left mouse button down and up when mouse is at the same location or approximately the same location |
| D-Click | Mouse button down and up twice with interval shorter than a predefined value |
| Set Value | Keyboard input into an editable user interface control |

In some embodiments, the mapping table 130 may be modified through user intervention to accommodate new verbs in the help document 118. Once the operation action corresponding to a text instruction is identified using the mapping table 130, the parsing module 120 may store data regarding the identified operation action in an operation record, such as an operation record 132.

In at least one embodiment, if the parsing module 120 cannot map a verb to an operation action based on the mapping table 130, the parsing module 120 may prompt the user to manually enter or select an operation action that corresponds to the verb via a user interface prompt.

The parsing module 120 may also parse the operating object from a text instruction in the help document 118 based on the syntax and/or format of the text instruction. For example, in the text instruction "click the Help button", the noun "Help button" follows the verb "click" (separated by the article "the"). Moreover, in some help documents, the noun in a text instruction may be highlighted or formatted in some standardized way to distinguish it from the verb. For example, the noun "Help button" may be formatted in bold type. Thus, the parsing module 120 may recognize such syntactic or standardized format parameters, and deduced the name of the operating object (i.e., targeted UI element) that is present in the text instruction. Subsequently, the parsing module 120 may use the name of the operating object to locate the targeted UI element in the user interface of the application 114.

In some implementations, the UI elements in the UI of the application 114 may be organized into a hierarchical tree in which each UI element may be represented by a node in the hierarchical tree. For example, the UI of the application 114 may be implemented using the Microsoft Active Accessibility (MSAA) application program interface (API) that is developed by the Microsoft Corporation of Redmond, Wash. Accordingly, by accessing the MSAA API, the parsing module 120 may obtain properties of the UI element that correspond to the noun derived from the text instruction, including name, type, value, and/or the like. Further, the parsing module 120 may also obtain the handlers for the parent and child UI elements of each UI element in the hierarchical tree. Accordingly, the parsing module 120 may derive a hierarchic path from a root of the hierarchical tree to the UI element. Once the hierarchic path is obtained, the parsing module 120 may store the hierarchic path of the UI element into the operation record 132 as a hierarchic string structure. An example hierarchic string structure is illustrated in FIG. 2.

Figure 2:
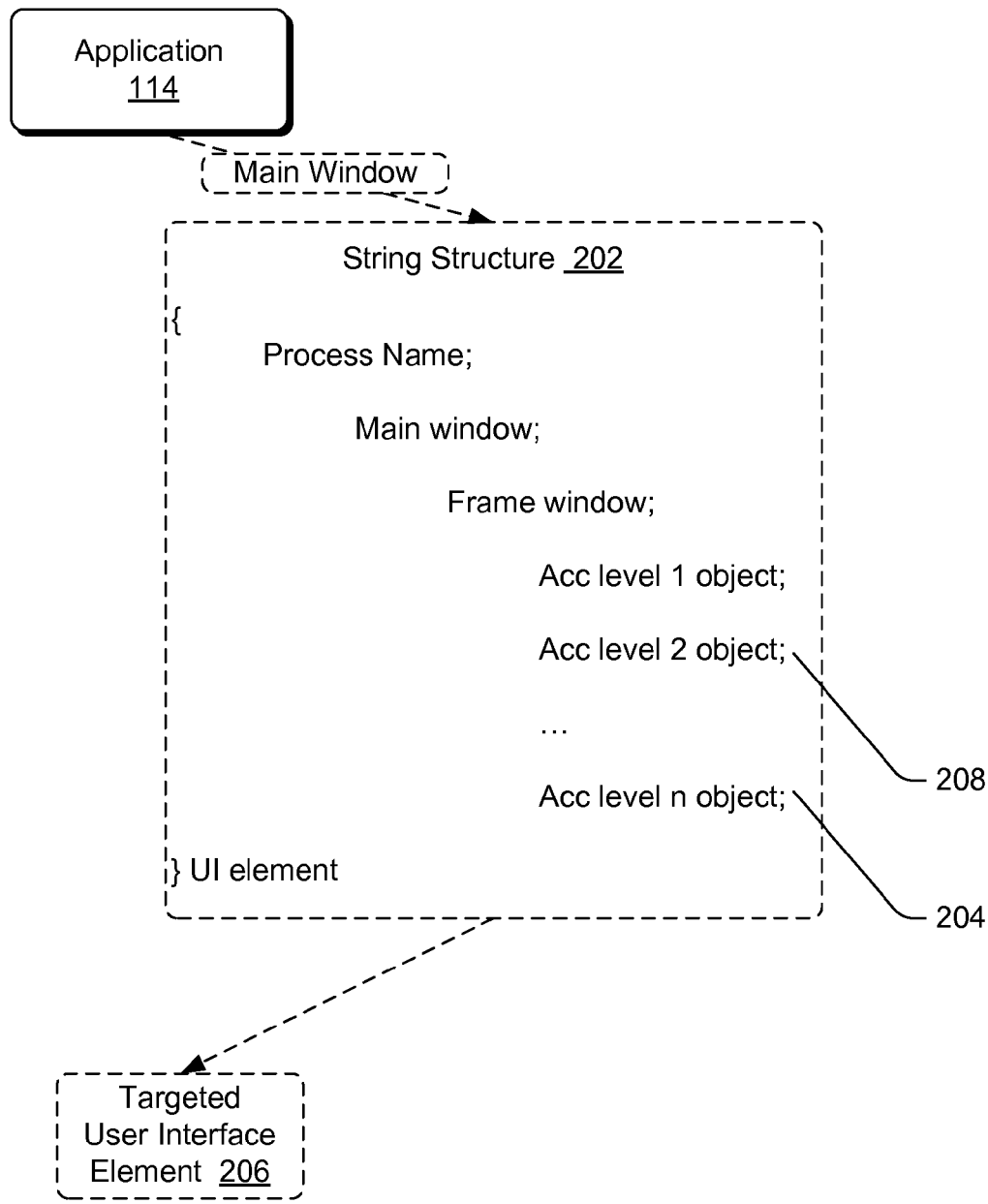
FIG. 2 is a schematic diagram illustrating an example hierarchic string structure that denotes a hierarchic path from a main window of an application to a particular UI element in the user interface of the application.

FIG. 2 is a schematic diagram illustrating an example hierarchic string structure 202 that denotes a hierarchic path from a main window of an application, such as the application 114, to a particular UI element in the user interface of the application. As shown, the example hierarchic string structure 200 may be composed of a series strings, from the string "Process name" to the string "Acc level n object". In this structure, each "Acc object" denotes a standard description of a UI element that is supported by most applications, such as the application 114. As a whole, the strings denote the hierarchic organization of UI elements. In various embodiments, each of the Acc level objects may contain a plurality of properties, such as a "name" property, a "type" property, and/or the like. The Acc level object with a lowest level, which is an object 204, may denote the targeted UI element 206 that is in an operation. The Acc level objects on the corresponding higher levels may denote a parent of the targeted UI element, the parent of the parent, and so forth. For example, as shown, an object 208 is the parent of the targeted UI element, that is, the object 204. In this way, the hierarchical structure 202 may denote a hierarchic path from a main window of the application 114 to the targeted UI element 206.

Returning to FIG. 1, the parsing module 120 may repeat the text parsing and operation record generation for a plurality of step-by-step text instructions from the help document 118 that are related to the completion of a particular task. Subsequently, the parsing module 120 may group the set of operation records into a single file for storage in the data cache 128.

In some embodiments, the parsing module 120 may further insert one or more cursor move action instructions into at least some consecutive operations records in the set of operation records that are grouped into a single file. The cursor move action instructions may play a role of smoothing out the eventual animated presentation. For example, the cursor move action instructions may cause a mouse cursor to transit smoothly and/or gradually across a displayed UI of the application 114 rather than simply jump from one location to another location on the displayed UI. Thus, the movement of the cursor in the eventual animated visualization may more easily discerned by an observer.

The publishing module 122 may insert one or more selectable controls into the help document 118 to generate a corresponding enhanced help document 134. As further described below with respect to the client device 104, the nature of the inserted selectable controls is such that the activation of each selectable control may provide an animated visualization of the text instructions for completing a task using corresponding operation records. In other words, each selectable control may cause a script application to "play" a corresponding set of operation records related to the completing a task. Thus, for each set of instructions for performing a particular task using the UI of the application 114 in a document page of the help document 118, the publishing module 122 may insert a corresponding selectable control into the document page. Each of the selectable controls may be in the form a menu button, a selectable text string, a hyperlink, and/or the like, that is clickable by the user.

The compiler module 124 may be used by a user to decompile or re-compile help documents, such as the help document 118. In some instances, the user may wish to edit the help document 118 prior to the generation of the operation records 132. The user may wish to insert, delete, or modify one or more of the step-by-step text instructions in the help document 118. Alternatively, the user may desire to create a completely new help document for the application 114. The compiler module 124 may be used to decompile a help document into an editable text document, as well as compile one or more editable text documents into help documents.

The editor module 126 is a text editing application that may be used by user to edit help documents, such as the help document 118, which have been decompiled into editable text documents. Additionally or alternatively, the editor module 126 may be used to create new text documents that can be compiled into corresponding help documents. In further embodiments, the editor module 126 may be used to edit the mapping table 130.

The data cache 128 may store the operation records generated by the parsing module 120, as well as the mapping table 130 used by the parsing module 120. The data cache module 128 may further store the enhanced help documents 134 that are generated from the help documents 118. The data cache 128 may also store any additional data used by the respective modules in the memory 110, such as various intermediate data produced during the production of record operations, including data related to operation actions and/or data in the form of hierarchic string structures.

The operation records 132 and the enhanced help documents 134 generated on the computing device 102 may be distributed to the client devices 104 via the network 106. In some embodiments, an enhanced help document 134 for an application 114 and a set of operation records that correspond to the enhanced help document 134 may be distributed as a single package with the application 114. For example, a software installation program for the application 114 may copy the enhanced help document 134 and the corresponding operation records file onto the client device 104 during the installation of the application 114.

In other embodiments, an enhanced help document 134 for an application 114 and the corresponding operation records file may be distributed to the client device 104 as an upgrade to an existing help document that is already on the client device 104. For example, a software installation program may replace a help document that is on the client device 104 with an enhanced help document 134 and a corresponding operation records file.

In various embodiments, the distribution may include a download of the appropriate files from the computing device 102 to the client device 104 via the network 106. The download may be implemented by the corresponding software installation program. However, the transfers of the operation records 132 and the enhanced help document 134 may also be carried out via the use of data storage media (e.g., memory sticks, optical data storage discs, and/or the like).

As discussed above, the environment 100 includes the client device 104. The client device 104 may be a general purpose computer, such as a desktop computer, a laptop computer, a net book, a tablet computer, a mobile telephone, or the like. The client device 104 may includes one or more processors 136, memory 138, and/or user controls that enable a user to interact with the device. The user controls of the client device 104 may include, but are not limited to, combinations of one or more of keypads, keyboards, mouse devices, touch screens, microphones, speech recognition packages, and any other suitable devices or other electronic/software selection methods.

The memory 138 may store an operating system 140. The operating system 140 may include components that enable the client device 104 to receive data via various inputs (e.g., user controls, network interfaces, and/or memory devices), and process the data using the one or more processors 136 to generate output. The operating system 140 may include one or more components that present the output (e.g., display an image on an electronic display, store data in memory, transmit data to another electronic device, etc.). Additionally, the operating system 140 may include other components that perform various other functions generally associated with an operating system.

The memory 138 may also store a replay module 142 and an application 144. The replay module 142 may be implemented using routines, programs instructions, objects, scripts, and/or data structures that perform particular tasks or implement particular abstract data types. In various embodiments, the application 144 may be a version of the application 114 that includes the enhanced help document 134 in addition to the user interface elements 116. Moreover, files of operation records that correspond to the application 144, such as the operation records 132, may be further stored in the memory 138 due to the distribution described above.

The replay module 142 may load each operation record 132 and perform the defined operation action on the designated operating object (i.e., targeted UI element) of an application 144. In various embodiments, when a user clicks on a control in the enhanced help document 134, the replay module 142 may sequentially load the operation records 132 that correspond to step-by-step text instructions in the enhanced help document 134 for completing a particular task. The control to the enhanced help document 134 may be accessible to the user when the application 144 is executing in a desktop environment supplied by the operating system 140. In this way, the operation actions in the operation records may be sequentially implemented on the corresponding operating objects by the replay module 142 to provide an animated visualization of the steps for completing the particular task in the desktop environment.

Upon loading an operation record 132, the replay module 142 may ascertain the operation action that is to be performed based on the data in the operation record. Further, based on the hierarchic string structure stored in the operation record 132, such as the hierarchic string structure 202, the replay module 142 may also ascertain a location of the targeted UI element as presented on the desktop environment of the operation system 140. As described above, the hierarchic string structure stored in an operation record may describe a hierarchic path from a main window in a UI of the application 144 to a targeted UI element.

Accordingly, the replay module 142 may first obtain a handle of the main window of the UI of the application 144 using the hierarchic string structure. The replay module 142 may then traverse all the children UI elements of the UI to get to a UI element that matches a first level object (e.g., Acc level object) down the hierarchic path. If applicable, the replay module 142 may traverse all the children UI element of the UI element in the first level to get to a UI element (e.g., Acc level object) that matches a second level down the hierarchic path. In this way, the replay may repeat the traverse down one or more levels of the UI until the replay module 142 locates the targeted UI element specified in the hierarchic path. Subsequently, the replay module 142 may access a core application program interface (API) of the operating system 140 to obtain the two-dimensional coordinates, e.g., x and y coordinates of the targeted UI element as displayed on the desktop environment.

After obtaining both the operation action and the location of the targeted UI element specified in an operation record 132, the replay module 142 may automatically perform the operation action on the targeted UI element in the desktop environment. Since such a performance is presented to the user via the desktop environment, the replay module 142 may provide an animated visual representation of the underlying text instruction in the enhanced help document 134. Further, as a plurality of operation records 132 that relate to the completion of a task are played in sequence, an animated visualization of the steps for performing the task may be displayed by the replay module 142.

Figure 3:
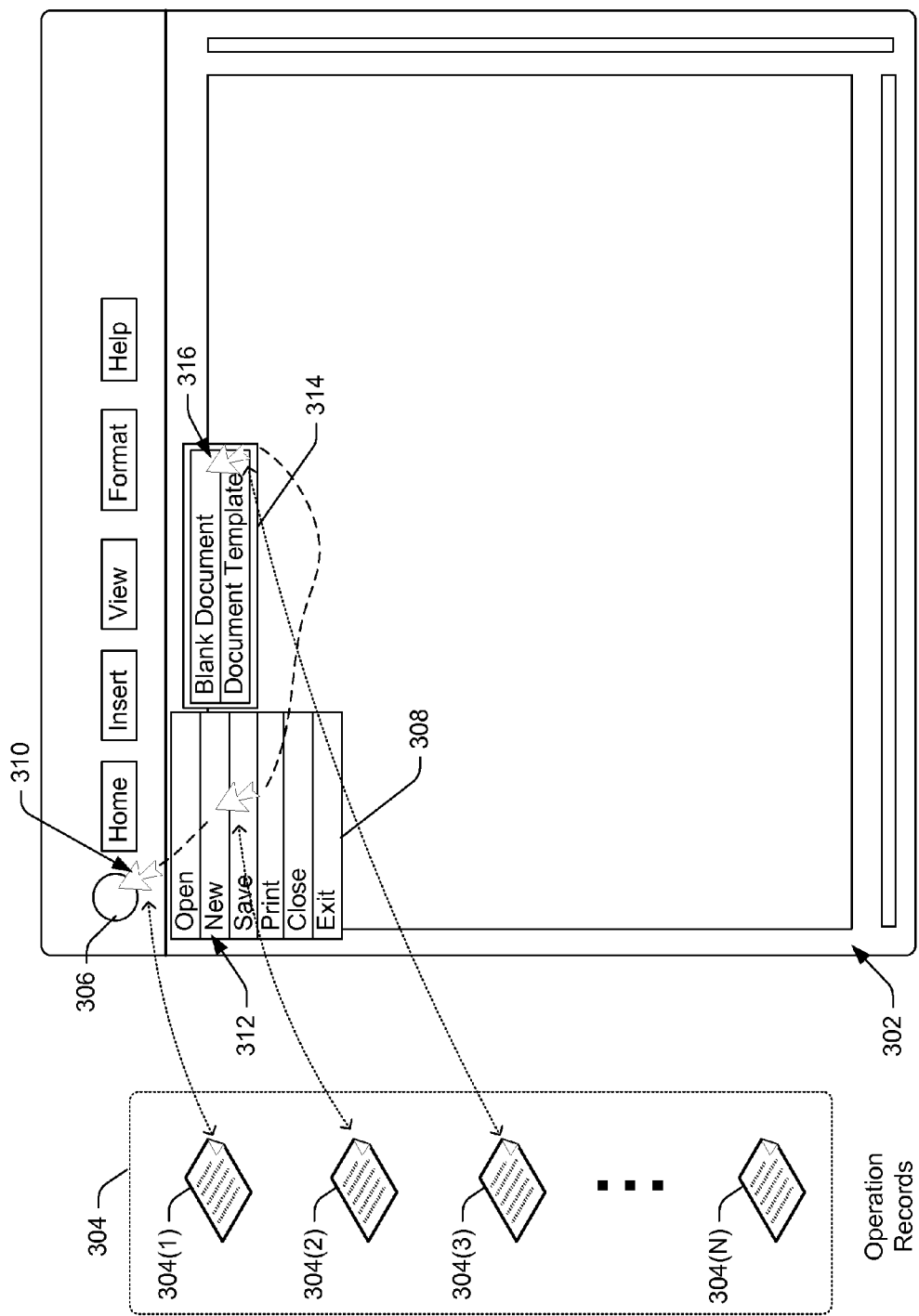
FIG. 3 is a schematic diagram illustrating an example animation of the text instructions in an enhanced help document.

FIG. 3 is a schematic diagram illustrating an example animation of the text instructions in an enhanced help document. As shown, the enhanced help document includes text instructions for a task of opening a new document using the user interface of an application 302. Further, a set of corresponding operation records 304 ("set") for completing the task may be available. Accordingly, the replay module 142 may first load a first operation record 304(1) of the set 304 that indicates a left-click (operation action) on a main user interface button 306 (targeted UI element) is performed to open a main menu 308. Accordingly, the replay module 142 may move a cursor 310 of the UI to the main user interface button 306 and perform the left click. The replay module 142 may then load a second operation record 304(2) that indicates a left-click (operation action) on a "new" menu item 312 in the main menu 308 to bring up a selection menu 314. Accordingly, the replay module 142 may move the cursor 310 to the "new" menu item 312 and left-click the menu item. The replay module 142 may then load a third operation record 304(3) that indicates a left-click (operation action) on a "blank document" menu item 316 (targeted UI element) in the selection menu 314. Accordingly, the replay module 142 may move the cursor 310 to the "blank document" menu item 316 and left-click the menu item. Such loading and implementation may continue until all operation records in the set 304 related to the text instructions for opening the new blank document, such as up to an operation record 304(N), are loaded and implemented. In some embodiments, the second operation record 304(2) may further include instructions for gradually moving the cursor 310 from a location of the main user interface button 306 to a location of the main menu 308, (as indicated by the dashed line tracking the movement of the cursor 310 between these locations), so that the user may discern the movement. Similarly, other operation records in the set 304 may contain instructions for cursor movement before or subsequent to the performance of operation actions so that the cursor transitions between the various menu items may appear smooth (e.g., as if performed by some user). In this way, the overall animation may be easier to follow by the user.

Following the animated visualization of the operation records, the replay module 142 may exit automatically. However, in at least one embodiment, the replay module 142 may present an option menu in the desktop environment prior to exit that enables the user to select to retain the operations that were performed during the animated visualization, or rollback, that is, undo the operations that were performed during the animated visualization. When a user selects the rollback option, the replay module 142 may undo all the operation actions that were performed on the corresponding UI elements during the animated visualization.

In some embodiments, when controls in the enhanced help document 134 are activated, the replay module 142 may access corresponding files of operation records 132 that are stored in the data cache 128 of the computing device 102.

Such access may be accomplished via the network 106. The replay module 142 may perform such access rather than access operation records 132 that have been distributed to the client device 104. For example, the computing device 102 may be a web server, and the controls in the enhanced help document 134 may present hyperlinks to the web server to retrieve the appropriate operation records.

In additional embodiments, the client device 104 may also include the modules 120-126, as well as the data cache 128. In other words, the client device 104 may independently perform the functions that are performed by the computing device 102, and thus remove a need for the computing device 102. For example, the additional of such functions to the client device 104 may enable the user of the device to independently create help documents and operation records for any application that is stored on the client device 104.

Example Processes

Figure 4:
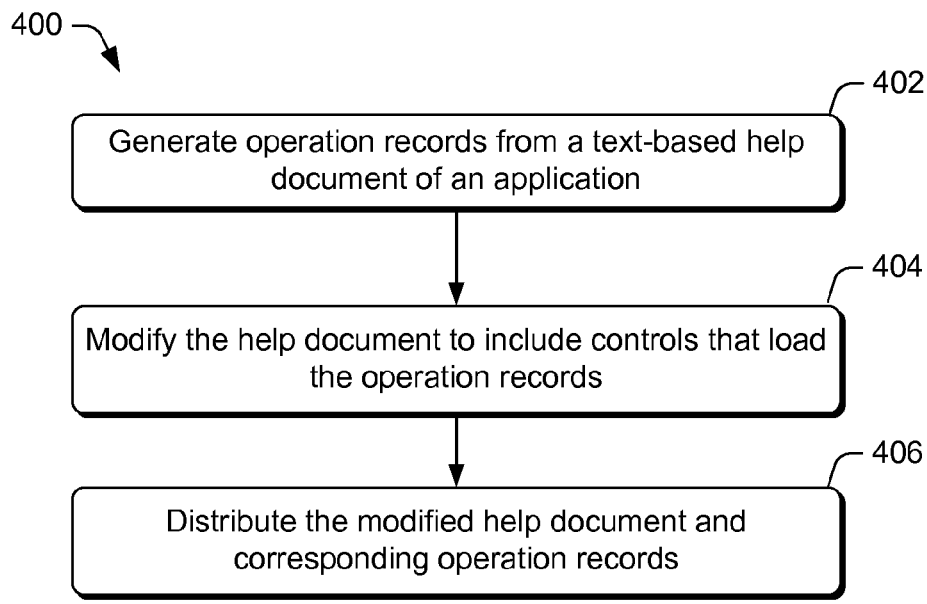
FIG. 4 is a flow diagram of an illustrative process to generate operation records for text instructions in the help document of an application.
Figure 5:
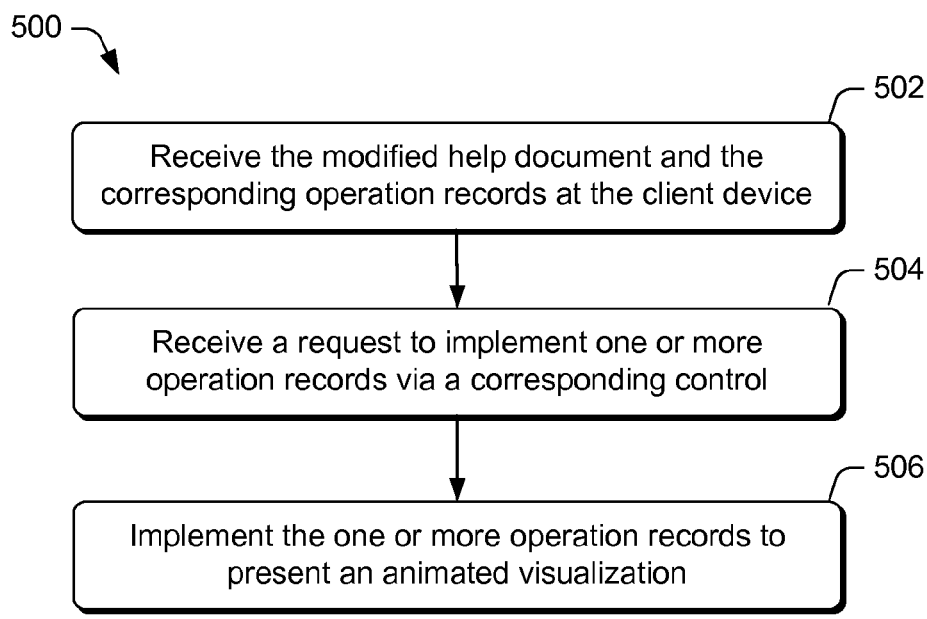
FIG. 5 is a flow diagram of an illustrative process to generate animated visualizations of text instructions based on operation records.

FIGS. 4 and 5 describe various example processes for implementing the help document animated visualization techniques. The example processes are described in the context of the environment 100 of FIG. 1, but is not limited to that environment. The order in which the operations are described in each example process is not intended to be construed as a limitation, and any number of the described blocks can be combined in any order and/or in parallel to implement each process. Moreover, the blocks in each of the FIGS. 4 and 5 may be operations that can be implemented in hardware, software, and a combination thereof. In the context of software, the blocks represent computer-executable instructions that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 4 is a flow diagram of an illustrative process 400 to generate operation records for text instructions in the help document of an application. At block 402, the parsing module 120 may generate operation records, such as the operation record 132, from a text-based help document 118 of an application 114. Each operation record 132 may include data on a particular operation action, as well as an operating object, i.e., targeted UI element on which the particular operation action is to be performed. In various embodiments, the parsing module 120 may organize the operation records 132 in multiple files, in which each file corresponds to a set of text instructions for completing a particular task using the application 114. The generation of an operation record 132 may include the insertion of instructions for cursor move actions into the operation record 132 to smooth out the eventual animated representation. In various embodiments, the help document 118 is created or modified (e.g., one or more instructions inserted, modified, and/or deleted) with the use of the compiler module 124 and the editor module 126 prior to the generation of the operation records 132.

At block 404, the publishing module 122 may convert the help document 118 into an enhanced help document 144 by inserting one or more controls into the help document 118. In various embodiments, a control may be inserted into a document page of the help document 118 to correspond to a set of text instructions for completing a particular task. The control may be subsequently used to access a corresponding set of operation records 132 that provide an animated visualization of the text instructions.

At block 406, the enhanced help document 134 and the corresponding operation records 132 may be distributed to one or more client devices 104. The distribution may be implemented via the network 106 or one or more storage media. As described above, the distribution may take place as part of an application installation or an upgrade to an existing help document of a pre-installed application.

FIG. 5 is a flow diagram of an illustrative process 500 to generate animated visualizations of text instructions based on the operation records. At block 502, the client device 104 may receive an enhanced help document 134 and the corresponding operation records 132. As described above, the client device 104 may receive the document 134 and operation records 132 via the network 106 or one or more storage media as part of an application installation or a help document upgrade, such as the installation or help document upgrade that results in the application 144.

At block 504, the replay module 142 may receive a request to implement one or more operation records 132 via a corresponding control that is embedded in the enhanced help document 134. The one or more operation records 132 may demonstrate the completion of a particular task, as outlined by a set of text instructions in the enhanced help document 134. Each operation record 132 may include data on an operation action and an operating object, i.e., the targeted UI element.

At block 506, the replay module 142 may implement the one or more operation records 132 to present an animated visualization of the text instructions to complete a task using the UI of the application 114. In various embodiments, the implementation of each operation record 132 may include locating the targeted UI element specified in the operation record 132 in a desktop environment and performing the specified operation action on the located targeted UI element. The desktop environment may be generated by the operating system 140 that is on the client device 104.

Example Electronic Device

Figure 6:
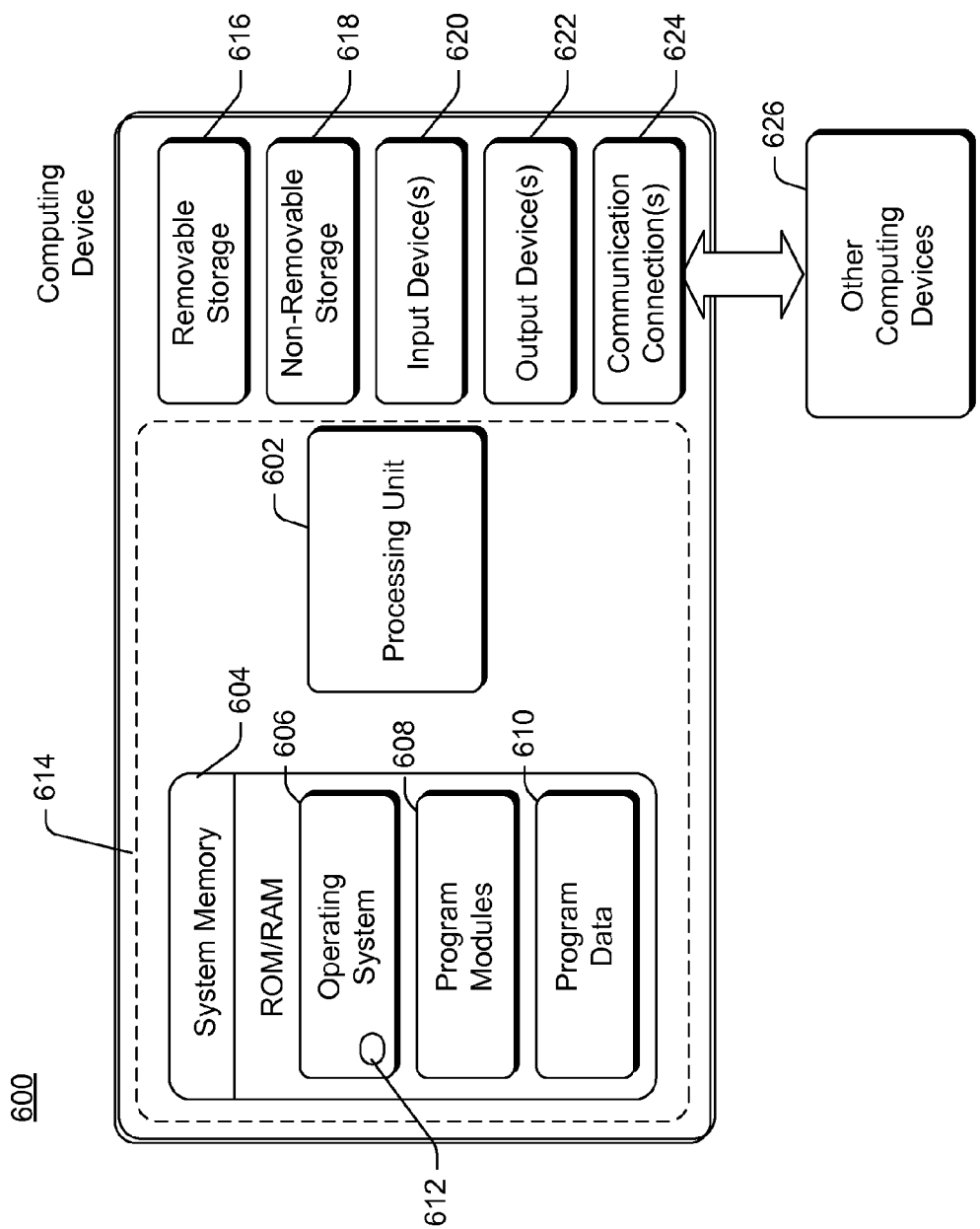
FIG. 6 is a block diagram of an illustrative electronic device that implements various aspects of help document animated visualization to produce an animated presentation of the steps that are to be performed to complete a task.

FIG. 6 illustrates a representative electronic device 600, such as the computing device 102 and/or the client device 104, which may be used to implement the help document animated visualization techniques. However, it is understood that the techniques and mechanisms described herein may be implemented in other electronic devices, systems, and environments. The electronic device 600 shown in FIG. 6 is only one example of an electronic device and is not intended to suggest any limitation as to the scope of use or functionality of the computer and network architectures. The electronic device 600 does not have any dependency or requirement relating to any one or combination of components illustrated in the example electronic device.

In at least one configuration, electronic device 600 typically includes at least one processing unit 602 and system memory 604. Depending on the exact configuration and type of electronic device, system memory 604 may be volatile (such as RAM), non-volatile (such as ROM, flash memory, etc.) or some combination thereof. System memory 604 may include an operating system 606, one or more program modules 608, and may include program data 610. The operating system 606 includes a component-based framework 612 that supports components (including properties and events), objects, inheritance, polymorphism, reflection, and provides an object-oriented component-based application programming interface (API). The electronic device 600 is of a very basic configuration demarcated by a dashed line 614. Again, a terminal may have fewer components but may interact with an electronic device that may have such a basic configuration.

Electronic device 600 may have additional features or functionality. For example, electronic device 600 may also include additional data storage devices (removable and/or non-removable) such as, for example, magnetic disks, optical disks, or tape. Such additional storage is illustrated in FIG. 6 by removable storage 616 and non-removable storage 618. Computer storage media may include volatile and nonvolatile, removable and non-removable media implemented in any method or technology for storage of information, such as computer readable instructions, data structures, program modules, or other data. System memory 604, removable storage 616 and non-removable storage 618 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by Electronic device 600. Any such computer storage media may be part of device 600. Electronic device 600 may also have input device(s) 620 such as keyboard, mouse, pen, voice input device, touch input device, etc. Output device(s) 622 such as a display, speakers, printer, etc. may also be included.

Electronic device 600 may also contain communication connections 624 that allow the device to communicate with other electronic devices 626, such as over a network. These networks may include wired networks as well as wireless networks. Communication connections 624 are some examples of communication media. Communication media may typically be embodied by computer readable instructions, data structures, program modules, etc.

It is appreciated that the illustrated electronic device 600 is only one example of a suitable device and is not intended to suggest any limitation as to the scope of use or functionality of the various embodiments described. Other well-known electronic devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The use of the help document animated visualization techniques described herein may reduce or eliminate user confusion over text instructions or misunderstanding of text instructions in a help document, and the effectiveness of the help document may be enhanced

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. One or more data storage devices storing computer-executable instructions that, when executed, cause one or more processors to perform operations comprising:
   obtaining a property associated with a user interface (UI) element of an application;
   parsing a text instruction in a text-based help document of an application to identify a noun and a related verb;
   determining, based at least in part on the property, that the noun corresponds to the user interface (UI) element of the application and that the verb corresponds to an operation action performed on the user interface (UI) element;
   generating, based at least on the determining, an operation record from the text-based help document of the application, the operation record including data for generating an animation of the operation action that is performed on the user interface (UI) element of the application, the animation including a visualization of steps for completing the operation action, and the generating including inserting one or more cursor move action instructions into data representing the operation action in the operation record;
   inserting controls into the text-based help document to generate an enhanced help document, the controls loading the operation record in the enhanced help document; and
   distributing the enhanced help document and the operation record to one or more client devices.

2. The one or more data storage devices of claim 1, wherein the operations further comprise compiling an editable text document into the text-based help document prior to the generating of the operation record.

3. The one or more data storage devices of claim 1, wherein the operations further comprise:
   decompiling the text-based help document into an editable text document;
   performing at least one of inserting, modifying, or deleting one or more text instructions in the editable text document; and
   re-compiling the editable text document into a text-based help document.

4. The one or more data storage devices of claim 1, wherein the operations further comprise integrating the operation record into the enhanced help document prior to the distributing of the enhanced help document.

5. The one or more data storage devices of claim 1, wherein the operations further comprise assigning the operation action to the related verb using an operation mapping table that links the operation action to the related verb.

6. The one or more data storage devices of claim 1, wherein the operations further comprise, as part of generating the operation record, storing at least a portion of the operation record for completing a task into a corresponding file.

7. The one or more data storage devices of claim 1, wherein the operations further comprise, as part of generating the operation record: traversing a user interface (UI) element tree of the application to obtain a hierarchic path from a main window to a user interface (UI) element of the application; and
   representing the user interface (UI) element of the application in the operation record via a corresponding hierarchic structure that includes hierarchical strings that lead from the main window of the application to the user interface (UI) element.

8. A method, comprising:
   receiving, by a client device, an enhanced help document and at least one operation record, the at least one operation record, when activated by a control in the enhanced help document, providing an animated representation of a text instruction in the enhanced help document, the at least one operation record including at least:
  data that denotes a hierarchic path from a main window of an application to a user interface (UI) element of the application, the user interface (UI) element being associated to a noun parsed from the text instruction;
  cursor movement instructions configured to smooth out movements of a mouse cursor on a display of the client device; and
  an operation action to be performed on the UI element, the operation action being associated to a verb parsed from the text instruction;
locating the user interface (UI) element of the application based at least on the hierarchic path upon activation of the control in the enhanced help document;
determining the operation action to be performed on the user interface (UI) element from the at least one operation record;
animating performance of the operation action specified in the at least one operation record on the user interface (UI) element to provide an animation of the text instruction, the animation including a visualization of one or more steps for completing the operation action;
modifying, based at least in part on the cursor movement instructions, at least one of the one or more steps to include a smooth movement of the mouse cursor from the one a first location to the a second location; and
presenting a control to enable a user to, upon completion of playing the animation, retain the operation action performed and undo the operation action performed.

9. The method of claim 8, wherein the enhanced help document is constructed from a text-based help document by inserting the control into the text-based help document.

10. The method of claim 8, wherein the receiving includes receiving the enhanced help document and the at least one operation record during an installation of the application or a help document upgrade for the application.

11. The method of claim 8, wherein the locating further includes locating two-dimensional pixel coordinates of the user interface (UI) element via an application interface (API) of an operating system that is running the application.

12. The method of claim 8, wherein the receiving includes receiving a plurality of operation records, including the at least one operation record, that are related to completion of a task described in the enhanced help document using a user interface (UI) of the application.

13. A system, comprising:
one or more processors; and
a memory that includes one or more software components that are executable by the one or more processors to:
  parse a text instruction in a text-based document of an application to identify a noun that corresponds to a user interface (UI) element of the application and a related verb that corresponds to an operation action performed on the UI element;
  in response to being unable to parse the text instruction for the related verb, prompt a user, via a user interface (UI), to manually enter the related verb or to select the operation action that corresponds to the related verb;
  receive, via the user interface (UI), one of the manual entry of the related verb or a selection of the operation action;
  generate, based at least in part on the noun and the related verb, an operation record from the text-based help document of the application, the operation record including data for animating the operation action that is able to be performed on the user interface (UI) element of the application as described in the text-based help document;
  modify the text-based help document to generate an enhanced help document including a control that loads the operation record;
  play an animation of the operation action that is able to be performed on the UI element upon activation of the control in the enhanced help document, the animation including a visualization of one or more steps for completing the operation action; and
  present an option menu to enable a user to, upon completion of playing the animation of the operation action, retain the operation action performed and undo the operation action performed.

14. The system of claim 13, wherein the one or more components are further executable to:
  locate the user interface (UI) element of the application based at least on a hierarchic path denoted in the operation record, the hierarchic path represented by a hierarchic structure that includes hierarchical strings that lead from a main window of the application to the user interface (UI) element;
  obtain the operation action to be performed on the UI element from data in the one of the operation record; and
  in response to the user retaining the operation action, perform the operation action specified in the operation record on the user interface (UI) element.

15. The system of claim 13, wherein the one or more components are further executable to:
  decompile the text-based help document into an editable text document;
  re-compile the editable text document into a text-based help document; and
  perform at least one of inserting, modifying, or deleting one or more text instructions in the editable text document.

16. The system of claim 13, wherein the one or more components are further executable to generate the operation record at least by parsing a text instruction in the text-based help document for a noun that corresponds to the user interface (UI) element and a related verb that corresponds to the operation action performed on the user interface (UI) element.

17. The system of claim 13, wherein the one or more components are further executable to generate one of the operation record at least by:
  traversing a user interface (UI) element tree of the application to obtain a hierarchic path from a main window to a UI element of the application; and
  representing the user interface (UI) element of the application in the operation record via a corresponding hierarchic structure that includes hierarchical strings that lead from the main window of the application to the user interface (UI) element.

18. The one or more data storage devices of claim 1, wherein the operations further comprise:
  in response to being unable to parse the text instruction for the related verb, prompting a user, via a user interface (UI), to manually enter the related verb or to select the operation action that corresponds to a verb.

19. The one or more data storage devices of claim 1, wherein parsing the text instruction in the text-based help document to identify the noun and related verb includes identifying the noun or related verb based at least in part on visual indicators associated with text of the noun or related verb.

\* \* \* \* \*